United States Patent Office 3,024,083
Patented Mar. 6, 1962

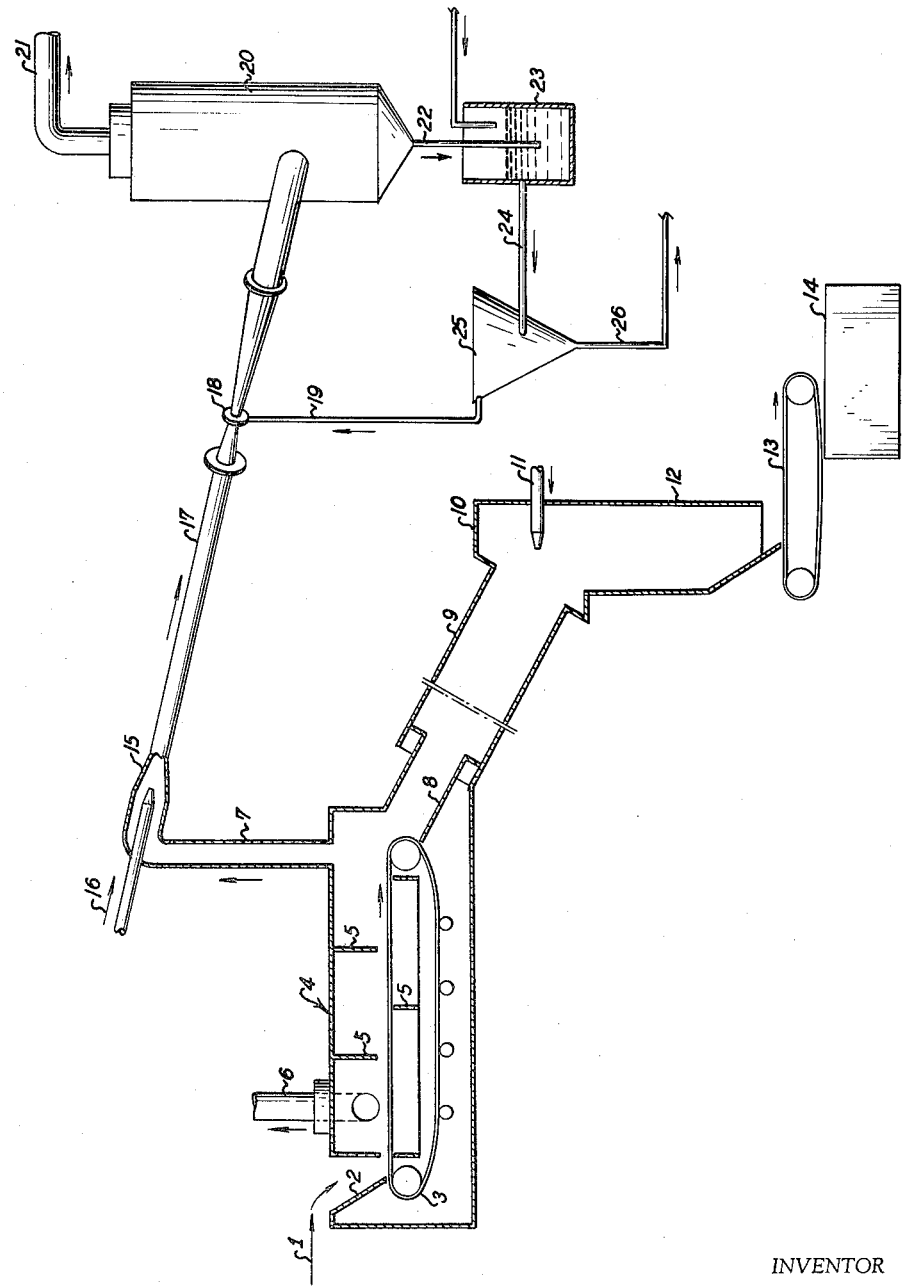

3,024,083
LITHIUM CHLORIDE RECOVERY
John White Colton, Pelham Manor, N.Y., assignor to Scientific Design Company, Inc., a corporation of Delaware
Filed June 27, 1957, Ser. No. 668,427
3 Claims. (Cl. 23—27)

This invention is concerned with the continuous recovery of lithium chloride and more particularly is concerned with a process and apparatus wherein a dust-laden lithium chloride gaseous mixture, produced by roasting spodumene with calcium chloride, is diluted with a fluid prior to forming an aqueous solution containing said lithium chloride.

Lithium metal and lithium salts have attained considerable commercial importance and various methods have been proposed heretofore for the recovery of such salts and also the metal.

Various methods have been employed to recover lithium chloride from the mineral, spodumene, which is a lithium aluminum silicate. In one method, the ore is roasted in the presence of calcium chloride and the gaseous mixture evolved is passed from the kiln through a waste heat boiler. Dust precipitated therein is passed to an extractor wherein it is contacted with water or recycled aqueous lithium chloride solution. The resulting mixture is passed to a separator such as a filter or wringer, wherein the solid is separated therefrom and recycled to the raw material mixer. The filtrate therefrom is passed to a second scrubber wherein it is contacted with gases passed from the waste heat boiler, the scrubbed gases are discarded and the liquid is passed to a lithium chloride evaporator. This recycle system has an over-all low efficiency as a result of time consuming extraction, separation and scrubbing steps in addition to extensive capital costs inherent in handling large liquid volumes. Further, the maintance of the waste heat boiler in operable condition provides a severely aggravated problem due to the adhesion of insulating dust deposits cemented with alkali chloride. Therefore, the art is confronted with the problem of providing an efficient lithium chloride recovery system having low capital cost and ease of operation.

It is an object of the present invention to provide an efficient, economical process for the continuous recovery of lithium chloride providing high capacity and ease of operation.

Various other objects, advantages and features of this invention will become apparent from the following detailed description taken in conjunction with the accompanying drawing.

It has been found that in accordance with this invention, that lithium chloride may be recovered from lithium ore by a new and useful process comprising roasting spodumene and calcium chloride to evolve a gaseous mixture containing lithium chloride, forming an aqueous solution containing said lithium chloride and recovering lithium chloride from siad aqueous solution, the step of diluting said gaseous mixture with a fluid to cool said mixture to below about 1100° F. prior to formation of said aqueous solution.

This invention in still another aspect concerns a process for the preparation of lithium chloride from spodumene ore, the combination of steps comprising; roasting spodumene and calcium chloride to form a gaseous mixture containing lithium chloride, diluting said gaseous mixture with a fluid to cool said mixture to below about 1100° F., passing the resultant gaseous mixture through a venturi scrubber to form an aqueous solution containing lithium chloride and recovering lithium chloride from said aqueous solution.

This invention in still another aspect concerns apparatus for the recovery of lithium chloride and comprises the combination of a roaster having a solid product outlet means and a gaseous product outlet means, a fluid dilution means in combination with said gaseous product outlet means adapted to cool the gaseous product to below about 1100° F., a venturi scrubber and a separator adapted to form an aqueous solution of said lithium chloride.

The invention may be understood in connection with the following description and the attached drawing which is explanatory of one of the many embodiments of the process, and which will be referred to in the specific illustrative example.

The drawing is a diagrammatic illustration of the process and an embodiment of an apparatus of the instant invention for the continuous recovery of a dust-laden gaseous mixture containing lithium chloride obtained from roasting lithium ore and calcium chloride.

Referring now to the drawing in detail, the raw material 1, beta-spodumene mixed with calcium carbonate, calcium chloride and sand, all finely ground, is fed to a feed hopper 2 and discharged upon a traveling grate 3. This grate carries the material through the precalcining zone 4 equipped with baffles 5, a vent stack 6, and exit 7 for a portion of the reaction gases and a means 8 to supply the feed material to the rotary kiln 9. The discharge end of the kiln is equipped with a firing hood 10 covering a burner inlet 11 which supplies heat to the rotary kiln maintained at about 1600° to 2800° F. The by-product, cement clinker, passes down through a clinker cooler 12 to a conveyor 13 and then to a storage bin 14. The gaseous mixture produced in the kiln and containing lithium chloride passes from the rotary kiln 9 into the precalcining zone 4 where it fills the chamber above the layer of granular material being conveyed on the traveling grate 3. A portion of the reaction gases, being liquid particles of fume size and borne by hot kiln gas, is withdrawn from the precalcining zone and passes out the exit 7; the remainder passes through the precalcining zone and is withdrawn by an exhaust fan connected to conduit 6. The baffles 5 direct the gases so that they travel the full length of the precalcining zone intermittently passing through the ore contained on the traveling grate.

Alternatively, the precalcining apparatus may be replaced with the pre-treatment apparatus disclosed and claimed in my co-pending application Serial No. 668,426 filed of even date herewith, wherein the gaseous mixture from the kiln is removed without substantial contact with the lithium ore preheating means.

The gaseous mixture is diluted 15 with sufficient cold air 16 to reduce its temperature below about 1100° F., then passes through a conduit 17 at high velocity to a venturi scrubber 18 wherein water or an aqueous solution is injected 19 near the throat, and then to a cyclone separator 20. An induced draft fan connected to a conduit 21 removes the gases from the cyclone separator and passes them to the atmosphere. Alkali chlorides are dissolved in water or aqueous solution in the venturi scrubber 18, the resulting enriched solution is collected in the cyclone separator 20, and withdrawn through conduit 22 to a sump tank 23. The solution is transferred through the conduit 24 to a clarifier 25. The overflow stream from the clarifier 25 is recycled 19 to the venturi scrubber 18. The underflow 26 containing a mixture of alkali metal chlorides is recovered and the desired lithium chloride is obtained therefrom.

This process may be combined with a process for making Portland cement clinker from spodumene ore, in which combination the ore is intimately mixed and roasted together with sand, limestone, and calcium chloride at a temperature of about 2600° to 2780° F. The recovery steps for both the cement clinker and the dust-laden gaseous mixture are the same as that described in the preceding description of the drawing.

Example 1

A gaseous mixture formed in the kiln is discharged at a temperature of about 1600° to 1800° F. with the following composition:

| | Parts/hour |
|---|---|
| $N_2$ | 36,500 |
| $O_2$ | 590 |
| $CO_2$ | 30,260 |
| HCl | 82 |
| $H_2O$ | 5,870 |
| Total gas | 73,302 |
| LiCl | 959 |
| NaCl | 111 |
| KCl | 84 |
| Dust | 185 |
| Total liquids and solids | 1,339 |

This mixture is drawn out the entrance of the kiln and into the precalcining zone where it passes over the lithium ore conveyed by the traveling grate. The resultant dust-laden gaseous mixture is withdrawn upwardly into a large-diameter conduit leading to a venturi scrubber. Prior to entrance to the venturi scrubber the gaseous mixture is diluted with 45,000 parts/hr. of air at 0° F. to reduce the temperature of the gaseous mixture below 1100° F. The resulting fume particles in the dust-laden gases are completely crystalline and display no tendency to stick to metal surfaces or agglomerate the accompanying dust particles into masses which tend to plug fine passages or to coat the heat exchange surface of waste heat boiler tubes.

The gaseous mixture, the temperature thereof having been reduced to below 1100° F., is introduced into the venturi scrubber. Here, the gases to be cleaned of suspended matter are accelerated to a velocity of about 250 feet per second and the washing liquid is introduced into the gas stream at 42,000 parts/hr. The velocity of the gas is utilized to cause the suspended matter to impinge upon and be trapped by the washing liquid and further to cause the break-up of the liquid into a multitude of fine droplets having an extremely large effective surface area for particle interception. It has been found that more than 99 percent of the dust and fume particles can be removed by such means. The resultant gaseous stream is passed to a cyclone separator where the dust and liquid droplets settle out of the gaseous stream and contain a major proportion of the volatilized alkali metal chlorides of the gaseous mixture. To the solution is added 27,585 parts/hr. of water. The diluted solution is sent to a clarifier where 42,000 parts/hr. is returned to the venturi scrubber. The underflow from the clarifier is filtered to remove suspended solids, and the filtrate has the following composition:

| | Parts/hour |
|---|---|
| LiCl | 950 |
| NaCl | 110 |
| KCl | 83 |
| HCl | 57 |
| $H_2O$ | 3,800 |

While it is preferred to employ air as the fluid to dilute the dust-laden lithium chloride gaseous mixture, other less economical inert diluents may be employed such as carbon dioxide and nitrogen.

Although lithium chloride has been employed in the description and example it is contemplated that other valuable base forming light metals such as rubidium and cesium may be recovered from analogous ores by this invention.

In controlling the temperature of the gaseous mixture prior to passing through the venturi scrubber, it is only necessary to control the fluid dilution so as to obtain the desired temperature. For example, if the temperature of the flue gases is about 1600° F., then the minimum air dilution at 0° F. will be about 0.45 pound of air per pound of flue gas. With this minimum dilution, the resulting fume particles were completely crystalline, and displayed no tendency to stick to metal surfaces or agglomerate the accompanying dust particles into masses which plug fine liquid passages. The maximum flow rate is limited only by the economics of the process. Because flue gas temperatures fluctuate over a small range, air dilution may be controlled manually by means such as a butterfly damper.

The precalcining zone may be any type of apparatus adapted to pass a gaseous mixture through a bed of ore.

In view of the foregoing disclosures, variations and modifications thereof will be apparent to one skilled in the art and it is intended to include within the invention all such variations and modifications except as do not come within the scope of the appended claims.

I claim:

1. In a process for the preparation of lithium chloride from spodumene ore, the combination of steps comprising roasting spodumene and calcium chloride to form a gaseous mixture containing fume size liquid particles of lithium chloride and also containing dust particles, crystallizing said particles of lithium chloride without agglomerating said dust particles by diluting and cooling said gaseous mixture to below about 1100° F. through introducing a gaseous fluid at a temperature below 1100° F. into said gaseous mixture, passing the resulting gaseous mixture through a venturi scrubber to form an aqueous solution containing lithium chloride, and recovering lithium chloride from said aqueous solution.

2. The process according to claim 1 wherein the diluting fluid is air.

3. The process according to claim 2 wherein the minimum rate of air dilution is about 0.45 pound of air per pound of gaseous mixture.

References Cited in the file of this patent

UNITED STATES PATENTS

| 999,494 | Ellis | Aug. 1, 1911 |
| 1,100,694 | Meyer | June 16, 1914 |
| 1,202,327 | Spackman et al. | Oct. 24, 1916 |
| 1,224,454 | Ellis | May 1, 1917 |
| 1,409,295 | Hechenbleikner | Mar. 14, 1922 |
| 1,497,263 | Frink | Jan. 10, 1924 |
| 2,604,185 | Johnstone et al. | July 22, 1952 |
| 2,627,452 | Cunningham | Feb. 3, 1953 |
| 2,726,138 | Cunningham | Dec. 6, 1955 |

OTHER REFERENCES

Hodgeman: "Handbook of Chemistry and Physics," Chemical Rubber Publishing Co., 33rd edition, 1951, page 517.